United States Patent [19]

Vidakovic et al.

[11] 4,132,258
[45] Jan. 2, 1979

[54] ARMORED TIRE

[75] Inventors: Aleksandar Vidakovic, Libertyville; Karl Salna, Mundelein, both of Ill.

[73] Assignee: International Harvester Company, Chicago, Ill.

[21] Appl. No.: 850,866

[22] Filed: Nov. 14, 1977

Related U.S. Application Data

[63] Continuation of Ser. No. 619,758, Oct. 6, 1975, abandoned.

[51] Int. Cl.² .................................. B60C 27/20
[52] U.S. Cl. ....................................... 152/185
[58] Field of Search ............... 305/11, 19, 35 EB, 38; 152/185.1, 185, 187, 190, 191

[56] References Cited

U.S. PATENT DOCUMENTS

| 3,205,023 | 9/1965 | Nodwell | 305/38 |
| 3,773,394 | 11/1973 | Grawey | 305/38 |
| 3,776,291 | 12/1973 | Boggs | 305/19 X |

Primary Examiner—Robert B. Reeves
Assistant Examiner—John P. Shannon
Attorney, Agent, or Firm—Douglas W. Rudy; Ronald C. Kamp; F. David AuBuchon

[57] ABSTRACT

A pneumatic spacer and cushioning tire assembly, having an armored peripheral track fitted thereto is provided for use on construction and earthworking equipment. The track assembly has a belt of elastomer insulated inextensible filaments constrained between anchor plates and traction plates. The interior surface of the track assembly prevents movement between the track and the tire.

2 Claims, 6 Drawing Figures

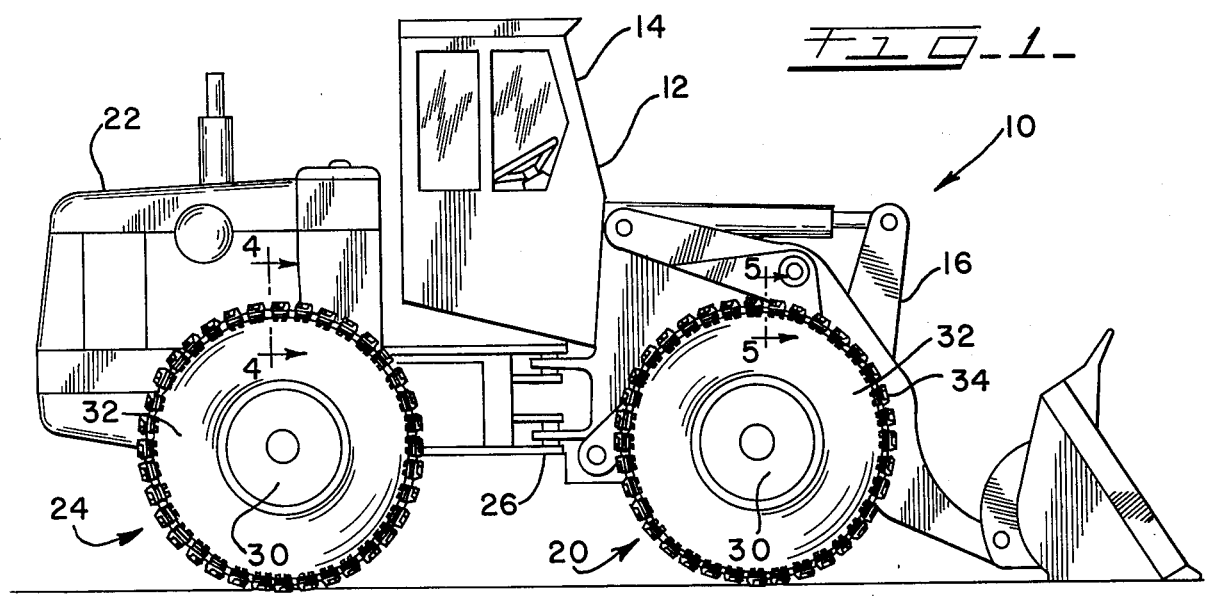
FIG-1-
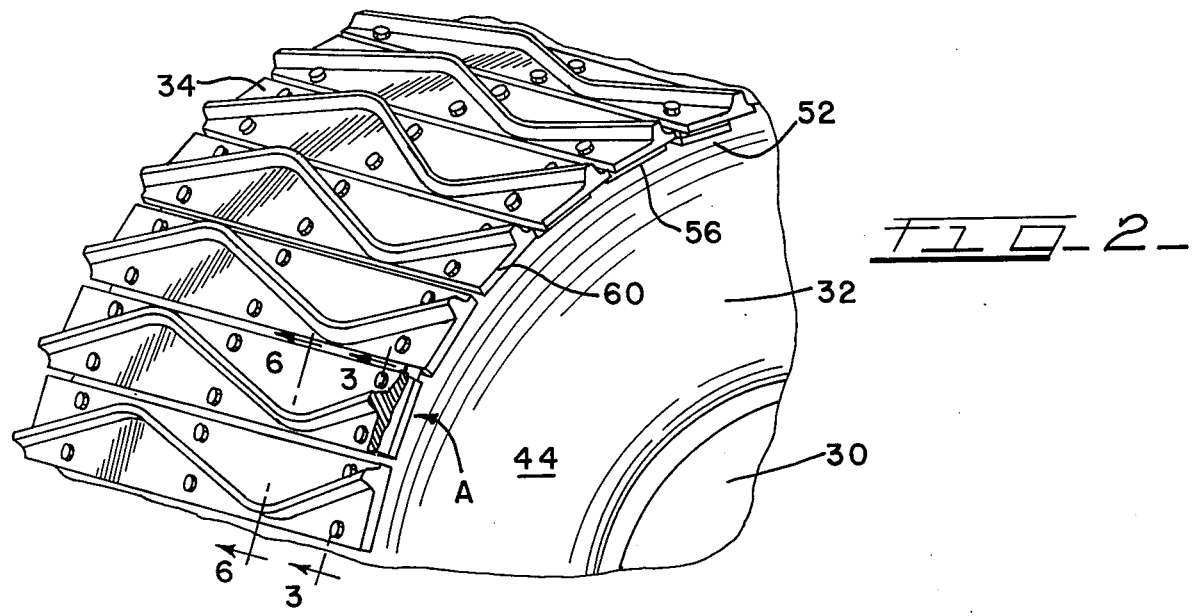
FIG-2-
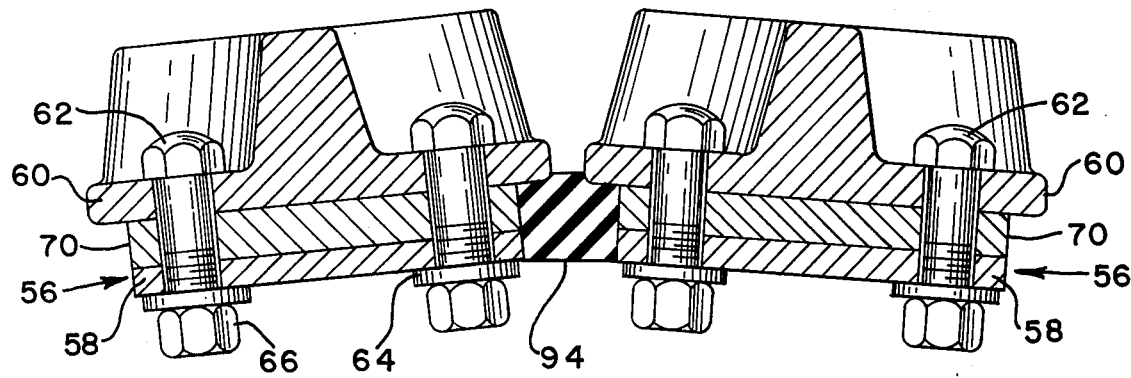
FIG-3-

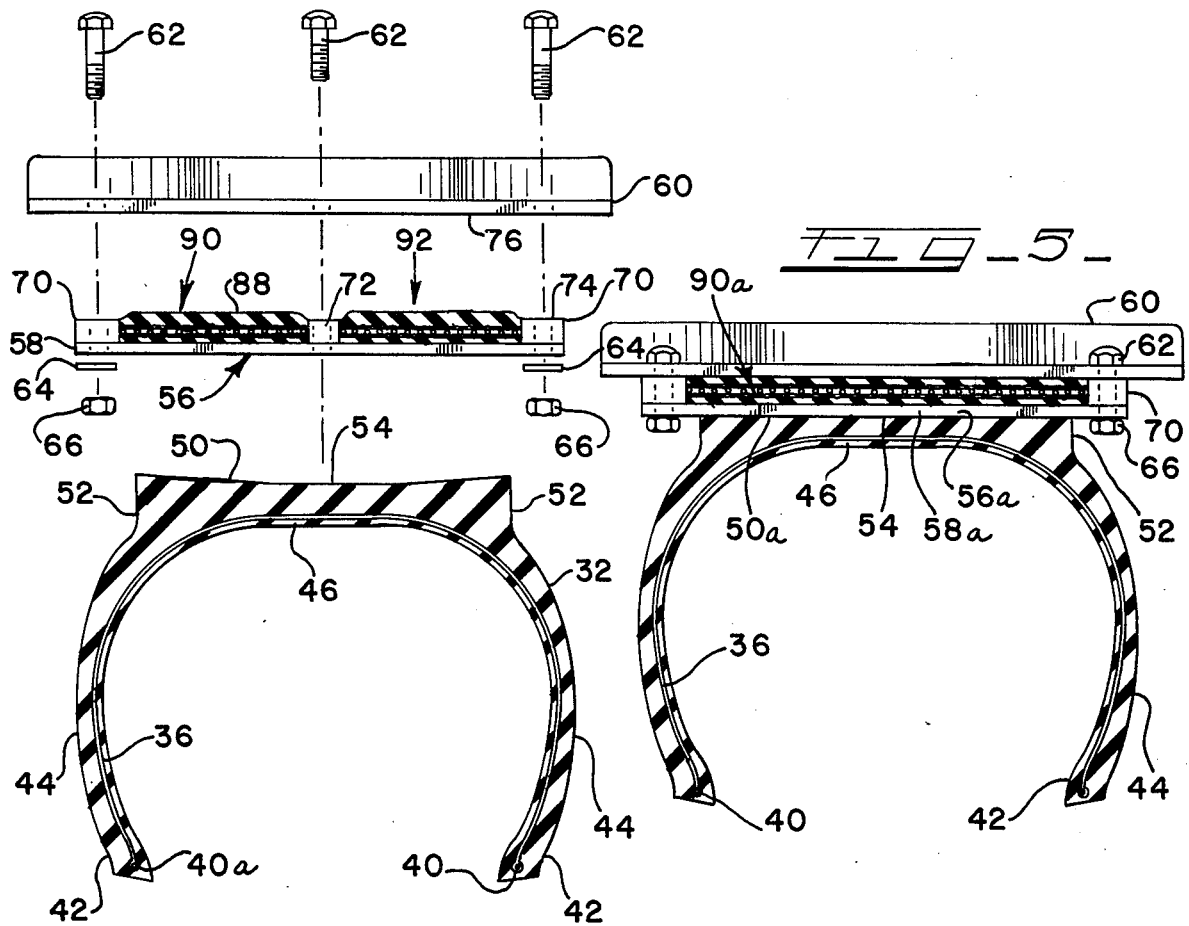

ARMORED TIRE

This is a continuation of application Ser. No. 619,758 filed Oct. 6, 1975 abandoned.

CROSS-REFERENCES TO RELATED APPLICATIONS

This application is related to the application entitled ARMORED TIRE HAVING A FLEXIBLE TAPERED BELT ARRANGEMENT invented by Aleksandar Vidakovic and Karl Salna which was filed the same day as this application.

BACKGROUND OF THE INVENTION

1. Field of the Invention

This invention relates to armored tires having a traction plate equipped ground engaging surface. A pneumatic tire is equipped with an armored peripheral track for use on construction and earthworking equipment.

The armored peripheral track has a belt constrained between anchor plates and traction plates. The track, with the anchor plates innermost, is disposed around the periphery of a pneumatic tire on the tread section thereof such that ground engaging traction plates radiate from the assembly.

2. Description of the Prior Art

Vehicles equipped with pneumatic tires which work in construction and other harsh environments are oftentimes driven on extremely detrimental or otherwise difficult road surfaces. Numerous articulated and conventional loaders, scrapers, dump trucks and grades, etc. operate in rock quarries, mines, foundries, refuse yards and other locations where the tires of the vehicle are continually exposed to puncture producing and wear inducing elements. Additionally, traction at some sites may be so limited that conventional rubber tired vehicles are disadvantaged.

As the tires for large construction type vehicles are expensive it is economically advantageous to minimize exposure to tire damaging elements. One way that this tire wear problem may be alleviated is through the use of endless track vehicles. These vehicles have high tractive efficiency, good stability, and good floatation characteristics. Bulldozers, power shovels, and cranes are often seen with dual endless track ground engaging means.

Conversely, endless track vehicles do have certain disadvantages that make them undesirable in some material handling applications. For instance, two track vehicles have speed limitations due to the track assembly. Heat generated by the track links may be severe enough at high speeds to cause premature failure of the tracks. Also road shock and vibration dampening characteristics are poor with conventional tracked vehicles.

On the other hand a vehicle having pneumatic tires may be capable of relatively high speed. The tires also provide a major portion of the shock dampening function of the vehicle suspension. Thus for construction vehicles, such as loaders and dump trucks, which operate at high speed a pneumatic tire may be more advantageous.

In some instances the traction plates used either in tracked vehicles or armored tire vehicles may be designed to have a high tractive interface between the vehicle and the ground. A tracked vehicle also may have better floatation characteristics than an untracked vehicle.

In order to realize the combined benefit of the endless track and the pneumatic tire it is highly desirous to combine the armor protection of a traction plate with the high speed capability of a pneumatic tire.

Many attempts to armor tires using plates held in position on the tire by means of chains, links, cables, etc. have been tried for special applications. Specific examples of track linked over tires are shown in U.S. Pat. No. 3,601,212 to Peterson, et al and U.S. Pat. No. 3,612,624 to Stedman. These adaptations of linked tracks and pneumatic tires provide a shock dampening advantage as well as tire armoring, however, the linked track limits the speed of the vehicle due to the high frictional heat buildup in the linking components which may cause a high rate of wear in the components.

The troublesome link track systems have been improved upon by several inventions as typified by the invention disclosed in U.S. Pat. No. 3,773,394 to Grawey. In the Grawey invention the traction plates are fastened to anchor plates which accommodate a plurality of independent circumferential belts. This belt structure is positioned on the crown of the pneumatic tire and the tire is inflated into the belt and track structure. A continuous and flat interior belt surface contacts the pneumatic tire carcass and provides frictional engagement therewith.

The belt structure of the Grawey Patent includes an elastomer spacer between the edge of each anchor plate and the circumferential belt so that the belt surface, which contacts the crown portion of the tire or the tread portion of the tire, is smooth. Therefore a continuous interior belt surface contacts the pneumatic tire carcass and provides frictional engagement therewith.

The armored tire with the belt arrangement of this invention is on a wheel for use on an earthworking or transporting vehicle. The tire comprises a conventional, preferably radial, tire body having beads, body plies, sidewalls and a tread section in the crown thereof. The tread section would have a smooth surface shaped either in a flat or concave manner most compatible with the belt assembly.

The belt assembly would be constructed of flat anchor plates, a composite belt or belts, end spacer means, middle or center spacer means and traction plates fastened to the anchor plates such that the belt is contained therebetween. Interior spaces bounded by the edges of each anchor plate, the belt and the tread surface of the tire are not occupied by elastomer. As the tire and separate belt assembly is inflated on an appropriate wheel the tire will "grow" such that its tread will expand into the belt assembly allowing the partial extrusion of the tire tread surface elastomer into the previously mentioned unoccupied spaces.

The extrusion of the tread surface into the spaces between the anchor plates aids in the transmittal of torque between the tire and the belt assembly and consequently allows full transmission of torque between the vehicle and the ground surface with virtually no creep or slippage between the tire and the belt assembly in normal operation.

SUMMARY OF THE INVENTION

A pneumatic tire, preferably of radial construction, is provided with an armored peripheral track assembly having an endless belt or belts composed of inextensible filaments insulated in an elastomer composition contained between a plurality of anchor plates, the anchor plates having direct contact with the pneumatic tire tread surface, and a plurality of traction plates.

An unoccupied zone (no extruded elastomer) exists between the edge surfaces of each anchor plate. When the anchor plates and traction plates have been assembled with the belt therebetween, thus forming the peripheral track assembly, and the assembly is positioned on the pneumatic tire, the unoccupied zone is bounded on four sides. The belt, the edge of the anchor plates and the exterior crown portion of the pneumatic tire make up the boundaries. The unoccupied zone may also be closed at each end thereof by an elastomer plug conforming to the boundaries and retained thereby.

The resulting combination of a pneumatic tire and an armored peripheral track assembly may be advantageously used on construction and earthworking equipment where the combination will provide armor protection to limit damage to the pneumatic tire, high tractive engagement between the ground and the host vehicle as well as shock and vibrationing dampening advantages. Of the more significant objects of this invention is to provide a vehicle support and cushioning system, namely an armored pneumatic tire, that increases the tractive ability of the vehicle while at the same time providing armor thereon to prevent damage to the system and extend the service life thereof.

A further object of the invention is to provide an armored peripheral track that is maintained on a tire without the need for lugs and interlocking engagement apertures and projections.

Another object of the invention is to provide a armored track system for use on a loader vehicle that allows high vehicle speed operation without detrimental effect to the peripheral track.

Another object of the invention is to provide a track assembly for use on a pneumatic tire that will not creep or slip on the tire.

Also an object of the invention is to provide a peripheral track and tire assembly where there is uniform contact pressure between the track and the tire thus providing complete sealing between the track and the tire.

A further object of this invention is to produce an armored tire at a reasonable cost that will have increased fatigue and service life.

BRIEF DESCRIPTION OF THE DRAWINGS

The invention presented herein is shown in the following drawings in which:

FIG. 1 is a side elevation view of an earthworking vehicle equipped with the armored tire belt arrangement of this invention;

FIG. 2 is an isometric projection of a portion of a tire and a wheel assembly presenting an embodiment of the invention;

FIG. 3 is a cross sectional view taken through plane 3—3 of FIG. 2;

FIG. 4 is a section view taken through plane 4—4 of FIG. 1 showing the components of the invention and a preferred embodiment of an anchor plate in disassembled relationship;

FIG. 5 is an alternative sectional embodiment having components of the invention assembled together taken through plane 5—5 of FIG. 1; and FIG. 6 is a cross sectional view taken through plane 6—6 of FIG. 2.

DETAILED DESCRIPTION OF PREFERRED EMBODIMENTS

Review of the figures will lead to the understanding of the various embodiments contemplated by this invention.

FIG. 1 illustrates an earthworking vehicle, namely a loader, generally 10, having a forward portion 12 including an operator's cab 14 and the loader bucket apparatus 16 as well as a front drive axle assembly which includes a pair of wheel and tire assemblies, the right side assembly shown generally as 20. The rear portion of the vehicle 22 may house the prime mover of the vehicle as well as a rear drive axle assembly which includes a pair of wheel and tire assemblies. The right rear wheel and tire assembly is shown generally as 24 with a similar assembly provided on the left side of the vehicle (not shown). The front and rear tire assemblies are similar in this embodiment.

The loader vehicle 10 as shown is of the articulated type which is steered through the pivotal relationship between the forward 12 and the rear 22 portions of the vehicle around the articulation joint 26.

FIGS. 1 and 2 plainly show the invention as incorporated on the loader vehicle 10.

A wheel, sometimes referred to as wheel rim, 30 is carried on an axle (not shown) and supports a pneumatic tire 32 which has been inflated such that it is retained on said wheel 30. An armored peripheral track 34 is circumferentially disposed on the crown or tread surface of the pneumatic tire.

It would be helpful to refer to FIG. 4 for an understanding of the pneumatic tire preferred in this embodiment. The supporting wheel is not shown. FIG. 4 shows a cross sectional view of a pneumatic tire taken through plane 4—4 of FIG. 1. This tire 32 is basically of radial construction, that is, the cords of the body plies 36 or the carcass plies run from bead 40 to bead 40a in a virtually perpendicular relationship to the respective beads. Although only one body ply 36 is shown it is to be understood that a single or alternatively a plurality of body plies, at the discretion of the tire designer, may be used. The single body ply is shown to avoid unnecessary complication in FIG. 4. The radial tire has the usual configuration of a bead 40 (and 40a) in the bead area 42 thereof, as well as sidewalls 44 interposed between the bead areas 42 and the crown section 46. The rubber portion above crown of the tire is generally referred to as the tread section 50 which has shoulders 52 and a smooth surface. The smooth tread surface may be contoured with a gently sloping profile from the shoulder 52 of the tread down to the center 54 of the tread 52 in order to present a flat tread surface upon inflation of the tire.

The preferred embodiment of the armored peripheral track 34 previously mentioned will be explained in conjunction with FIGS. 1-6. FIG. 4 shows a single segment of the track in an disassembled orientation. Components of the track 34 included an anchor plate 56, a traction plate 60, belts, generally 90 and 92, and fastening means such as bolts 62 for use with lock washers 64 and nuts 66.

The anchor plate, generally 56, having a base plate 58 in the preferred embodiment, is equipped with a plurality of spacers such as the end spacers 70 at each outboard end of the anchor plate 56. The anchor plate of FIG. 4 is also provided with a tapped and threaded center spacer 72 located midway between each end spacer 70 on the base plate 58. The end spacers 70 are drilled with a pair of aligned holes or apertures 74 which project through the end spacers as well as through the base plate 58. These holes allow the passage of bolts 62 which are the fastening means of the assembly.

The anchor plate 56 has a flat cross sectional shape.

The contour of the top surface of the base plate (of the anchor plate) is similar to the contour of the bottom surface as the base plate is uniform in thickness throughout its length. A pair of channels are formed between the end spacers 70, the center spacer 72 and the base plate 58 of the anchor plate 56.

Note that the upper surface of each of the end spacers 70 and the upper surface of the center spacer 72 are in the same plane so that they may each rest securely against the bottom surface of the traction plate 60 when fastened together without deflecting either the anchor plate or the traction plate.

The anchor plates 56, and subsequently the traction plates 60 of the armored peripheral track 34 (of FIG. 2), are related to a double belt structure in order to form a ring of anchor plates and traction plates. The belt structure is an endless belt having a laminated assembly with layers of material to give the belt strength and integrity. In this embodiment the layers, progressing outwardly from the upper surface of the anchor plate (FIG. 6), are a first elastomer layer 80, a first textile fabric breaker ply 82, an inextensible filament (insulated in elastomer) ply 84, a second textile fabric breaker ply 86, and finally a cap of elastomer 88. The finished belt or belts will be generally cylindrical endless belts.

The most significant component of the endless belt structures is the inextensible filament ply. These plies would be most generally cables of brass plated (for good elastomer adhesion) steel wire. This ply gives the belt the strength necessary to simultaneously resist the force of the pneumatic tire expanding thereinto and the tractive force generated between the traction plates and the ground. The cables 92 shown in section in FIG. 4 run circumferentially in order to conform with the outside diameter of the tire above the anchor plates and are approximately, but not limited to, 3/16" in diameter. The cable spacing in FIG. 4 is only representative for clarity as there would be many more cables in each belt. An alternative to the brass plated wire cable would be inextensible filaments of synthetic fibers.

The first elastomer layer 80, the first and second breaker plies and the second elastomer layer 88 cushion and isolate the inextensible filament ply 84 from damage from either the anchor plates, the traction plates, or the working environment. The second elastomer ply or cap of elastomer 88 serves another function as a torque maintenance means. Note in FIG. 4 that the top surface of the cap of elastomer 88 extends above the upper surfaces of the end spacers 70 and the center spacer 72. When the traction plate 60 is fastened to the anchor plate 56 the cap of elastomer 88 will be compressed by the bottom surface 76 of the traction plate such that the endless belts are contained under pressure between the anchor plates, the end spacers and the center spacer. It is not necessary that a portion of the cap 88 flow between the upper surfaces of the spacers and the bottom surface of the traction plate although due to manufacturing inaccuracies and stress deflection of the components a limited amount of elastomer may flow into this zone, however, this would not be detrimental to performance of the couple. The compression of the belt between the traction plate and the anchor plate will prevent movement between the traction plates and the belt and also, of course, between the anchor plates and the belt.

Note that the traction plates project past the ends of the anchor plates. In other words the traction plates are longer than the anchor plates. This can be seen at A of FIG. 2 where the end of a traction plate has been broken away to reveal the anchor plate. The traction plates are also longer than the width dimension of the tire from sidewall to sidewall. Not only does the traction plate increase the footprint of the track but it also serves to protect the sidewalls of the tires from upwardly projecting obstacles over which the host vehicle may be traveling.

Note that the fastening bolts 62 will attach the traction plate 60 to the anchor plate 56. The outboard bolts rely on lock washers 64 and nuts 66 to provide a fastening couple while the center bolt is threaded and torqued into the tapped center spacer. All the bolts are equally torqued to specification. It may be pointed out that the tapped portion related to the center spacer may project into the anchor plate such that the center bolt will be treadably connected to the tapped center spacer and the anchor plate. Tapping of the anchor plate is optional. Six bolts would be used in a typical traction plate to anchor plate embodiment, two at each end of the anchor plate and two in the center of the anchor plate.

The manufacturing of the armored peripheral track would be independent of the manufacture of the pneumatic tire. The pneumatic tire would be constructed in a conventional manner while the track would be somewhat unconventional. The belts or belt of the track would be assembled on a laminating drum and transferred to a forming and curing press. Before the belt or belts are molded the anchor plates (typically thirty-six anchor plates for tires as used on the loader vehicle 10 of FIG. 1) would be appropriately positioned in the belt mold so that the anchor plates can be bonded under temperature and pressure to the endless belts. This will increase the strength of the couple between the anchor plates and the belts.

After the armored peripheral track 34, including the anchor plates 56, the endless belt or belts, generally 90 for the first belt and 92 for the second belt, and the traction plates 60 have been assembled together the track can be positioned on a tire. The pneumatic tire will be mounted on a wheel 30 and partially inflated. The track assembly 34 will be positioned circumferentially around the periphery of the pneumatic tire such that the center of the tread 54 is aligned with the center portions of the anchor plates. When the armored peripheral track is in position the pneumatic tire is inflated to the design inflation pressure and the tread section 50 of the tire is tightly engaged with the track due to the radial growth or expansion of the carcass. By providing a somewhat concave shape on the tread surface of the tire and allowing for uniform pressures to develope across the carcass profile, more uniform belt loading is experienced creating a tight tire-belt assembly. As previously mentioned the interior circumference of the track is just slightly less than the circumference of the tire around the tread. FIG. 6 shows that a portion of the tread 50 may be extruded between the anchor plates 56. This combination of tight fit between the tire and the track and extrusion of rubber into the void between the anchor plates due to the compressive load thereon prevents slipping or creeping between the anchor plates and the tire.

This extrusion is desirous as it aids in the transmission of torque between the tire and the track assembly. There is no need to have any retaining lugs as the peripheral track is self-contained through the tire inflation pressure. The tire carcass surface remains continuous both circumferentially and transversely without any channels or grooves.

The endless belt assembly as positioned on the tire precludes the need for belt centering lugs. The surfaces of the tire in contact with the anchor plates work together to keep the track centered on the tire. Due to the freedom to build tire profile while the tire is being inflated the tire to belt contact pressure will be uniform throughout the tire profile. The belt arrangement, with a properly shaped tire, will seal the tire to the track assembly especially at the tire shoulders.

The life of the track belts is increased over prior art devices by the elimination of the elastomer filler between the anchor plates. As shown in FIG. 6, in this embodiment the space between anchor plates is void except for the material extruded into the cavity from the tread section of the tire. The belt may flex over a thinner section thus increasing the service of the belt components.

FIG. 3 shows a section view of the armored peripheral track at the outboard end thereof. Shown are the anchor plates 56, specifically the base plates 58, the end spacers 70, the traction plates 60 and appropriate fastening means, 62, 64, and 66. Also shown is an elastomer plug 94 which may be inserted between the anchor plate and end spacers of adjacent assemblies. The plug will penetrate to the outboard edge of the belts and contact the end spacers, anchor plates and traction plates of adjacent assemblies. The plug 94 is provided to aid in the exclusion of foreign material from the void between the anchor plates, the tire tread surface and the belts.

An alternative embodiment of the invention is shown in FIG. 5.

FIG. 5 shows an embodiment very similar to that previously described with the difference being that the central spacer shown as 72 of FIG. 4 has been eliminated thus allowing the use of a single full width belt assembly rather than the twin belt assembly of FIG. 4. The belt would be identical to the structure previously described as 90 and 92. However, in this alternative embodiment it would be a full width belt as shown by 90a. Incidentally, FIG. 5 shows the traction plate bolted in place to the anchor plate and the track in position on the tire. This may reinforce the concept of the component arrangement of FIG. 4 in the assembled state.

A deviation from the preferred embodiment involves the use of an anchor plate lining pad (not shown) which is positioned between each anchor plate 56 and the tread surface 50 of the pneumatic tire 32. This anchor plate lining pad is of an elastomer material generally conforming dimensionally with the anchor plate surface which is in contact with the tread section of the tire. The lining pad may assist in providing a good couple between the armored peripheral track 34 and the pneumatic tire 32 in some situations as any irregularities in either the base of the anchor plate or the tread of the tire will be filled with elastomer of the lining pad.

Although several embodiments of the invention have been set forth above, several other alternative embodiments would fall within the scope of this invention. For instance, the pneumatic tire, specifically recited as a radial construction tire, could alternatively be a conventional bias construction tire, a belted-bias construction tire, a belted-radial construction tire, or a spirally wrapped toroidal tire.

Thus it is apparent that there has been provided, in accordance with the invention, an armored tire having a flexible belt arrangement that fully satisfies the objects, aims, and advantages set forth above. While the invention has been described in conjunction with specific embodiments thereof it is evident that many alternatives, modifications and variations will be apparent to those skilled in the art in light of the foregoing description. Accordingly, it is intended to embrace all such alternatives, modifications and variations as fall within the spirit and broad scope of appended claims.

What is claimed is:

1. In combination, an armored peripheral track and a tire and wheel assembly where the tire is provided with a smooth flat tread surface, the armored peripheral track having at least one circumferential ply to which a plurality of anchor plates, including end spacers, and a plurality of traction plates are affixed in a spaced apart relationship around the circumferential ply providing an interrupted internal surface, the armored peripheral track for use on the tire which is inflated into the track, the combination further comprising:
    an elastomer plug placed between adjacent anchor plate and traction plate assemblies at the outboard ends thereof, the elastomer plug penetrating to the outboard edge of the circumferential ply whereby the spaces between said anchor plate assemblies are sealed at the outboard ends thereof.

2. In combination an armored peripheral track and a tire and wheel assembly where the tire is provided with a smooth flat tread surface, the combination further comprising:
    an inextensible belt having inextensible filaments insulated in elastomer, the belt forming a cylindrical endless belt having an outside diameter constant across the belt;
    a plurality of anchor plates disposed circumferentially around the inside diameter of said inextensible belt, at spaced apart intervals, transversely oriented to said belt;
    said anchor plates further equipped with end spacers having apertures;
    a plurality of traction plates having a plurality of apertures, said traction plates disposed circumferentially around the outside diameter of said belt in an orientation transverse thereto at spaced apart intervals corresponding to the stated location of said anchor plates;
    fastening means passing through said apertures in said anchor plates and said apertures in said traction plates for forming a couple therebetween which compresses said belt and provides, through the location of said traction plates, an armored peripheral track surface on the outside diameter of said belt and an interrupted surface on the inside diameter of said belt through the location of said anchor plates; and
    an elastomer plug placed between adjacent anchor plate and traction plate assemblies at the outboard ends thereof, the elastomer plug penetrating to the outboard edge of the inextensible belt whereby the spaces between said anchor plates are sealed at the outboard ends thereof.

* * * * *